United States Patent
Carelli et al.

(12) 
(10) Patent No.: US 6,259,760 B1
(45) Date of Patent: Jul. 10, 2001

(54) UNITARY, TRANSPORTABLE, ASSEMBLED NUCLEAR STEAM SUPPLY SYSTEM WITH LIFE TIME FUEL SUPPLY AND METHOD OF OPERATING SAME

(75) Inventors: Mario D. Carelli, Greensburgh, PA (US); Lawrence Green, St. Petersburg, FL (US); Dmitry V. Paramonov, Monroeville; Nelson J. Zhan, Pittsburgh, both of PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/392,011

(22) Filed: Sep. 8, 1999

(51) Int. Cl.[7] .............................. G21C 1/02; G21C 13/02; G21C 15/24; G21C 19/28
(52) U.S. Cl. ............................................ 376/346; 376/406
(58) Field of Search .................................... 376/404, 405, 376/406, 346, 287

(56) References Cited

U.S. PATENT DOCUMENTS 3,859,165 * 1/1975 Radkowsky et al. ................... 176/18
4,127,443 * 11/1978 Wetch et al. ............................ 176/22
4,851,181 * 7/1989 Takeda et al. ......................... 376/267

FOREIGN PATENT DOCUMENTS

674542 * 11/1963 (CA).
1049298 * 11/1966 (GB).

OTHER PUBLICATIONS

Nuclear Engineering International, "SIR—an imaginative way ahead," p. 32–34, Jun. 1989.*
Nuclear Engineering International, "Putting passive safety into practice at the Gorky/Voronezh AST–500 plants," p. 18–20, Jul. 1989.*

* cited by examiner

Primary Examiner—Charles T. Jordan
Assistant Examiner—Kyongtack K. Mun

(57) ABSTRACT

A unitary, transportable, assembled nuclear steam supply system (NSSS) with a lifetime fuel supply utilizes a fast or epithermal spectrum reactor core immersed in a pool of light water together with a plurality of steam generators through which the coolant is circulated by up to 100% natural circulation at full power, augmented by reactor coolant pumps also immersed in the pool. Redundant steam generators and reactor coolant pumps, together with the fast or epithermal spectrum reactor core and pool configuration, make it possible to operate the NSSS for 10 to 15 or more years without maintenance on the internals or refueling, thereby rendering the system proliferation resistant.

19 Claims, 3 Drawing Sheets

UNITARY, TRANSPORTABLE, ASSEMBLED NUCLEAR STEAM SUPPLY SYSTEM WITH LIFE TIME FUEL SUPPLY AND METHOD OF OPERATING SAME

BACKGROUND OF THE INVENTION

1. Field of the Invention

This invention relates to an apparatus and a method for producing steam from nuclear power for use in generating electricity. More particularly, it relates to system utilizing a fast or epithermal spectrum reactor core immersed in a pool of light water, together with redundant components such as steam generators and reactor coolant pumps, which can be operated for in excess of at least ten years and preferably more than fifteen years, without refueling or access to the internals, such that the system is proliferation resistant. The invention includes operating a nuclear steam supply system at lower average temperature than conventional reactors and with partial boiling in the core to achieve the reliability and efficiency needed for such maintenance-free long life.

2. Background Information

Nuclear steam supply systems (NSSS) employ a nuclear reactor to generate steam which is typically used to drive a steam turbine for the commercial production of electricity. The two most common types of NSSS, the PWR and BWR, utilize light water as the reactor coolant to extract heat from the reactor core. In the PWR (pressurized water reactor), the reactor coolant is circulated through two to four primary loops which include steam generators external to the pressure vessel housing the reactor core. The steam generators utilize the heat in the reactor coolant to convert feed water to steam which is delivered to the steam turbine in secondary loops. The hydraulic head for circulating the reactor coolant in the primary loops is primarily provided by reactor coolant pumps which are also located external to the pressure vessel.

In the BWR (boiling water reactor), the light water reactor coolant boils and the steam is delivered directly to the steam turbine, also typically in multiple loops. Reactor coolant pumps in return piping deliver the condensate of the reactor coolant back to the reactor core to complete the single cycle.

Both the PWR and the BWR are thermal spectrum reactors in which the light water reactor coolant also serves as a moderator. The neutronics of such a thermal reactor require materials with a low cross-section of neutron capture, such as Zircaloy® cladding to contain the fuel. Such reactors need to be refueled, typically about every 15 to 18 months. This requires access to the core for replacement and reshuffling of the fuel rods.

Another type of reactor, the liquid metal reactor (LMR), utilizes a liquid metal such as sodium as the reactor coolant. In order to maintain the separation between the feed water for generating steam and the radioactive primary sodium, an intermediate heat exchanger is mounted within the reactor vessel to heat a secondary sodium fluid which is then circulated through an external steam generator. Such size LMRs utilize a fast spectrum reactor core which can potentially provide a long core life.

A PWR utilizing a fast spectrum reactor core in a typical multiple external loop NSSS has been proposed. The fuel rods were arranged in a triangular, tight lattice configuration, with a pitch (spacing between rods) to diameter (of rod) ratio of less than about 1.1 to achieve the desired neutronics. This core had a proposed life between refuelings of about five years.

It is known to increase the heat transfer area of fuel rods by increasing the surface area such as with fins or lobes on the outer surface. This allows the fuel temperature to be reduced.

Advanced NSSS have been proposed with a primary focus on improved safety. These include a system in which the steam generators for a PWR are immersed in a circulating pool of light water within the reactor pressure vessel, without the need for primary loop piping, thereby eliminating one of the primary concerns in a PWR, the loss of coolant accident (LOCA). This system also uses a slow spectrum reactor core.

There has been little interest in recent years in new nuclear power plants. To break this stagnation affecting the nuclear industry, new reactor designs have been proposed from various sources. Characteristics addressed have been increased safety, reduced cost, reduced construction time, and ease of maintenance. Since it has been projected that whether and when a new reactor will be built, this will occur overseas, possibly in a developing country, the problem of nuclear proliferation has been raised.

While designs have been proposed which address some of these issues, and particularly the issue of safety, neither the presently available nor the proposed systems have adequately addressed the nuclear proliferation issue. The light water reactors, especially, require frequent replacement or reshuffling of the fuel rods, which means that the operator must access the core, creating the opportunity for proliferation. Even the proposed PWR with a fast spectrum reactor core only has a projected life of about five years. Also, while the proposed light water NSSS with the pool configuration removes the risk of a LOCA, the steam generators of a PWR are typically subject to failures. Placing them inside the pressure vessel increases the need to open the pressure vessel for maintenance.

There is a need, therefore, for an improved NSSS and its method of operation.

In particular, there is a need for such an improved system and method with enhanced safety, lower construction costs, lower operating costs, and which requires less maintenance.

There is an additional need for such a system and method which is proliferation resistant.

Specifically, there is a need for such a system and method which can be operated for ten or fifteen years or more, without replacement or reshuffling of the fuel rods, and which in general does not require access to the internals of the pressure vessel for at least that period of time.

SUMMARY OF THE INVENTION

These needs and others are satisfied by the invention, which is directed to a unitary, transportable, assembled nuclear steam supply system, which includes a reactor core immersed in a pool of reactor coolant in an upright pressure vessel. A plurality of steam generators are immersed in the pool of reactor coolant within the pressure vessel. Each of these steam generators has a secondary circuit extending outside the pressure vessel. The plurality of steam generators exceeds the number of steam generators needed to operate the nuclear core at full power. Means are provided to induce a flow in the pool of reactor coolant through the reactor core and the steam generators, and back to the reactor core. The pool configuration eliminates the piping losses inherent in a loop system, in addition to providing the obvious safety advantage that LOCAs and pipe rupture accidents are no longer possible. As the steam generators are more susceptible to failures, redundant steam generators in excess of the number required with the core at 100% power are provided, so that with the failure of a steam generator one of the spare generators can be activated, therefore eliminating the need to open the pressure vessel. This not only enhances overall system reliability, but contributes to the proliferation resistance of the system. While, as will be seen, the system is designed to promote natural circulation, redundant reactor coolant pumps are provided, so that again the pressure vessel does not have to be opened in the event of the failure of a pump.

The flow path of reactor coolant within the pressure vessel is defined by a core chimney which extends centrally upward within the generally cylindrical pressure vessel from the core, which is located generally centrally in the lower section of the vessel. This core chimney forms a central passage above the reactor core and an annular passage between the chimney and the adjacent inner surface of the pressure vessel. Circulation in the pool of reactor coolant is upward through the reactor core and the central passage and then downward through the annular passage to the underside of the reactor core. The plurality of steam generators are immersed in the pool of reactor coolant in the upper section of the pressure vessel. In one arrangement where drivelines for the reactor control rods extend upward through the central passage and through the top of the pressure vessel, the steam generators are all immersed in the pool of reactor coolant in the upper section of the pressure vessel along the annular passage. In another embodiment of the invention, where the control rods are positioned by drivelines extending through the bottom of the pressure vessel, additional steam generators can be immersed in the pool of reactor coolant in the upper section of the pressure vessel, aligned with the central passage.

In order to achieve a life of at least ten years and preferably fifteen years or more, a fast or epithermal spectrum reactor core is utilized. For enhanced safety, natural circulation is promoted and is even sufficient at 100% core power, although it is preferred to also have reactor coolant pumps. This enhanced natural circulation is made possible by a minimal pressure drop and a high driving head. As mentioned, the pool configuration eliminates the pressure drop in the piping which is inherent in the loop system. In addition, a large reactor $\Delta T$ (temperature differential between the outlet and inlet of the core) makes it possible to use a low coolant flow rate. As the exit temperature of the core is dictated by the pressure level, the inlet temperature is decreased to produce this large $\Delta T$. This is achieved by providing adequate steam generator capacity. To increase the driving head, partial boiling (about 5–20% and preferably 10% steam in the light water exiting the reactor core) increases the difference in density of the coolant between the exit of the reactor core and the exit of the steam generators. Additional driving force is generated by providing channels within the chimney which raise the level at which the partially boiling coolant mixes with the pool. More particularly, the steam generators provide sufficient capacity to produce a $\Delta T$ across the core of at least about 75 degrees C, and with partial boiling, a $\Delta T$ of at least about 100 degrees C.

The tight lattice of the fuel rods required for the neutronics of the fast or epithermal spectrum core tends to increase the pressure drop and therefore requires a slower flow rate. However, fuel rods with enhanced heat transfer area offset the decrease caused by the low flow rate necessary to keep the pressure drop low. Enhanced heat transfer area of the fuel rods is achieved by providing more heat transfer area on the rod than is available with a solid cylindrical rod. In particular, this increased heat transfer area can be achieved with annular lobe shaped or finned fuel rods.

The invention also embraces a method of constructing and operating a nuclear steam supply system. Such method includes immersing a fast or epithermal spectrum reactor core in a pool of light water in a pressure vessel. It also calls for immersing a plurality of steam generators in the pool of light water with the plurality of steam generators exceeding the number required for operation of the core at 100% power. At any given time, no more than this predetermined number of steam generators are activated. Thus, if a steam generator fails, one of the spare generators can be activated in its place. In addition, fewer steam generators can be activated for load following. As mentioned, the core can be operated to produce about 5–20%, and preferably about 10%, steam in the light water exiting the core. Sufficient steam generator capacity is used to produce a core inlet temperature of less than about 250 degrees C, and preferably about 235 degrees C. This allows the $\Delta T$ across the core to be at least 75 degrees C, and preferably 85 degrees C, without boiling. With boiling, the $\Delta T$ across the core can be increased to at least about 100 degrees C.

It is, therefore, a primary object of the invention to provide a nuclear steam supply system and a method of operation which has a life of ten to fifteen or more years at up to full power without the need for maintenance on the internals or replacement or reshuffling of the fuel rods. Another important object of the invention is to provide a nuclear steam supply system and method of operation with enhanced proliferation resistance.

It is another object of the invention to provide such a nuclear steam supply system and method of operation which is economical to manufacture, assemble, operate, and to ultimately dispose of.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
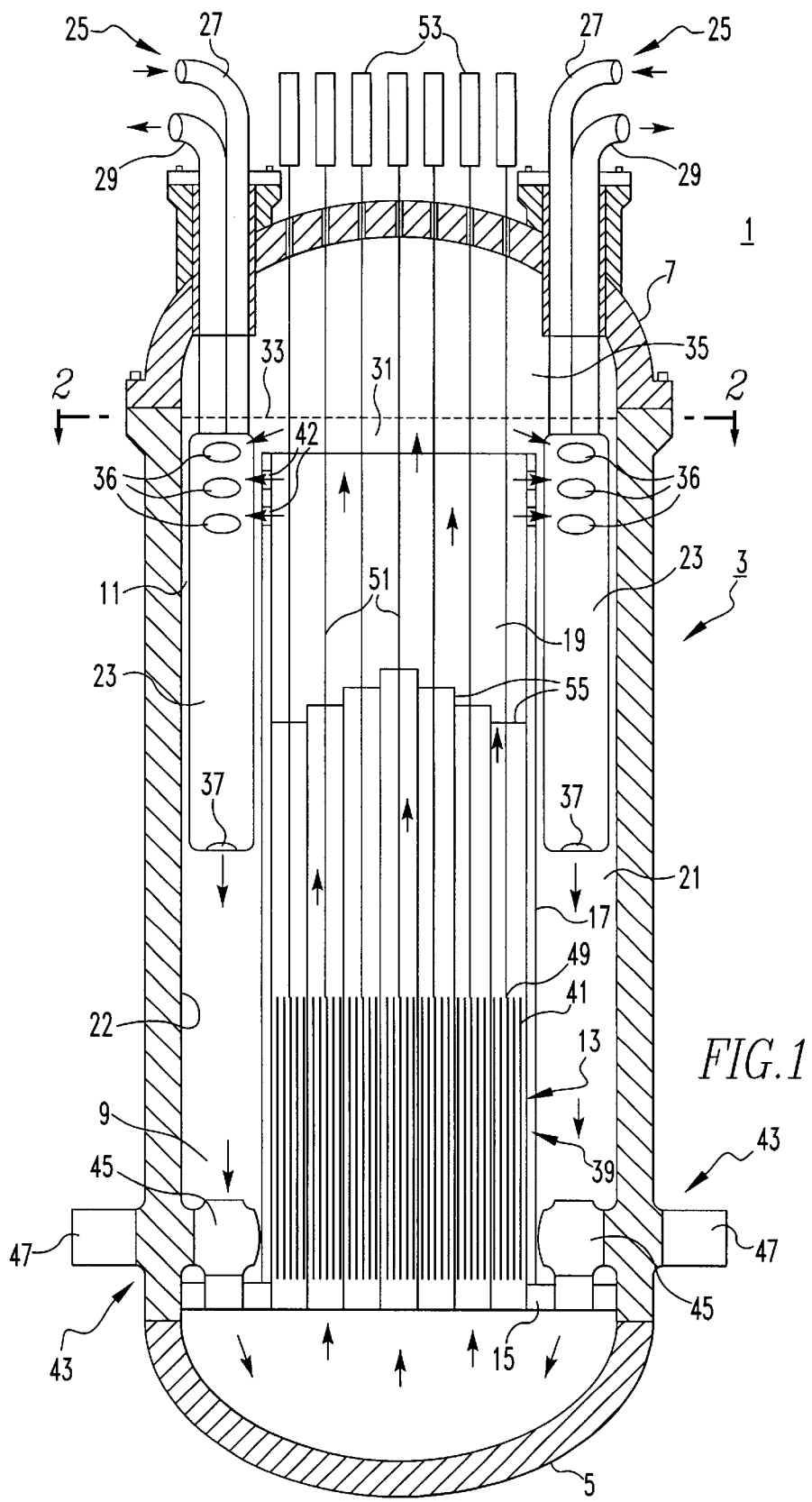
FIG. 1 is a schematic vertical section through a nuclear steam supply system in accordance with a first embodiment of the invention.

Referring to FIG. 1, the nuclear steam supply system (NSSS) 1 of the invention includes a pressure vessel 3 which is an upright cylinder with an integral bottom head 5 and a removable upper head 7. The upper head 7 is only removable for the insertion of the internals and is then permanently sealed to make the vessel proliferation resistant. This is possible because, as will be seen below, the internals are designed to have a useful life at full power of at least ten years and preferably fifteen years or more. The pressure vessel 3 has a lower section 9 and an upper section 11. The reactor core 13 is centrally positioned in the lower section 9 on a core support structure 15 spanning the lower section. A core chimney 17 surrounds the reactor core 13 and extends upward into the upper section 11 of the pressure vessel 3 to form a central passage 19 extending upward from the reactor core 13 and an annular passage 21 between the chimney 17 and the inner surface 22 of the pressure vessel.

A plurality of steam generators 23 are circumferentially spaced around the annular passage 21. Each of these steam generators 23 has a secondary circuit 25 which includes a feed water inlet pipe 27 and a steam outlet pipe 29, both of which extend out of the pressure vessel 3, in this case through the upper head 7.

The pressure vessel 3 contains a pool of reactor coolant 31 which fills the vessel up to the level 33, leaving a steam expansion space 35 above. Thus, the reactor core 13 and steam generators 23 are fully immersed in the pool of reactor coolant 31. The steam generators 23 have reactor coolant inlets 36 at their upper ends and outlets 37 at their lower ends.

The reactor core 13 has fuel assemblies 39, each containing a number of fuel rods 41. As will be described in more detail, the reactor core 13 has fast or epithermal spectrum neutronics. The heat generated by the fuel contained in the fuel rods 41 heats the reactor coolant which, as shown by the arrows, rises in the central passage 19 formed by the chimney 17, flows over the top of the chimney and through optional openings 42 near the top of the chimney into the annular passage 21. The reactor coolant then flows downward through the steam generator 23 to heat the feed water in the secondary circuit 25 and thereby produce steam, which can be used to drive a steam turbine-generator set (not shown). The reactor coolant exits the lower end of the steam generators 23 and continues down through the annular passage 21, through the core support structure 15 and then back upward through the reactor core 13. As will be seen, the conditions are such that this flow in the pool of reactor coolant can be produced by 100% by natural circulation, even at 100% core power. However, in order to assure adequate flow, and to promote mixing, a number of reactor coolant pumps 43 can be provided in the annular passage 21 at the core support structure 15. These pumps 43 have an impeller section 45 mounted in the annular passage 21, while the drive motors 47 are mounted on the outside of the pressure vessel, where they can be reached for change out or maintenance. A number of reactor coolant pumps 43 can be circumferentially spaced around the lower end of the annular passage 21 at the core support structure 15.

Figure 2:
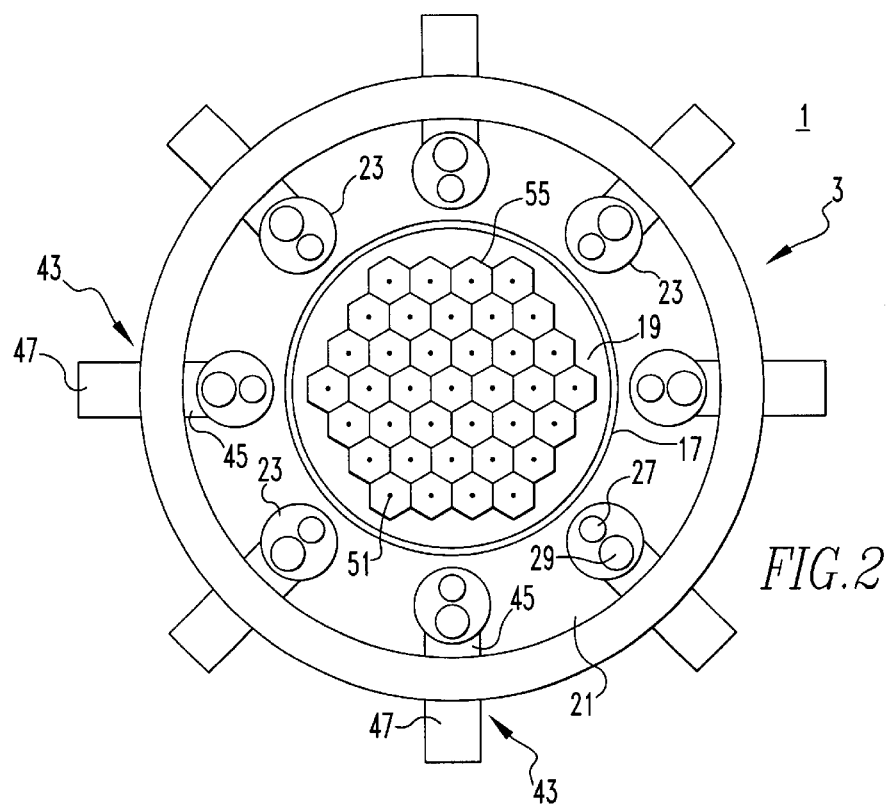
FIG. 2 is a cross-sectional view taken along the line 2—2 in FIG. 1.

As pointed out, one of the primary objectives of the NSSS 1 is proliferation resistance. A high degree of proliferation resistance is achieved by providing a reliable unit with a long life which does not require access to the internals. However, it was also discussed that the steam generators are a prime source of failures. Therefore, in accordance with the invention, a plurality of steam generators 23 in excess of a predetermined number of steam generators which are required to operate the reactor core at 100% power are provided in the pressure vessel 3. In the particular embodiment of the NSSS 1, shown in FIGS. 1 and 2, for example, where the predetermined number of steam generators required for full-power operation of the reactor core 13 is four, a plurality of eight steam generators is provided, so that there is 100% redundancy. At any one time, no more than four of the steam generators are activated. The steam generators are activated by circulating feed water through the secondary circuit 25, so that the steam generator draws heat from the pool of reactor coolant 31. The 100% redundancy is only exemplary, and more or less redundancy of the steam generators can be provided. Similar redundancy is provided for the reactor coolant pumps. Also by way of example only, six reactor coolant pumps could be provided where a maximum of three pumps would ever be run simultaneously. Less redundancy of the reactor coolant pumps may be needed as the motors are accessible from outside the pressure vessel for maintenance and replacement.

The pool configuration also contributes to enhanced safety, as it virtually eliminates the loss of coolant accidents and piping rupture events. It also contributes to the capability of 100% natural circulation by greatly reducing the pressure drop attributable to piping losses.

The reactor core 13 is provided with control rods 49 which can be inserted and removed from the core by drivelines 51 which extend upward through the upper head 7 and can be raised and lowered by control rod drives 53 located outside the pressure vessel 3. The control rods are used to shut down the reactor, and although the reactor may be run at 100% power for base loading, the control rods can also be partially inserted for reactivity control during load following.

Figure 3:
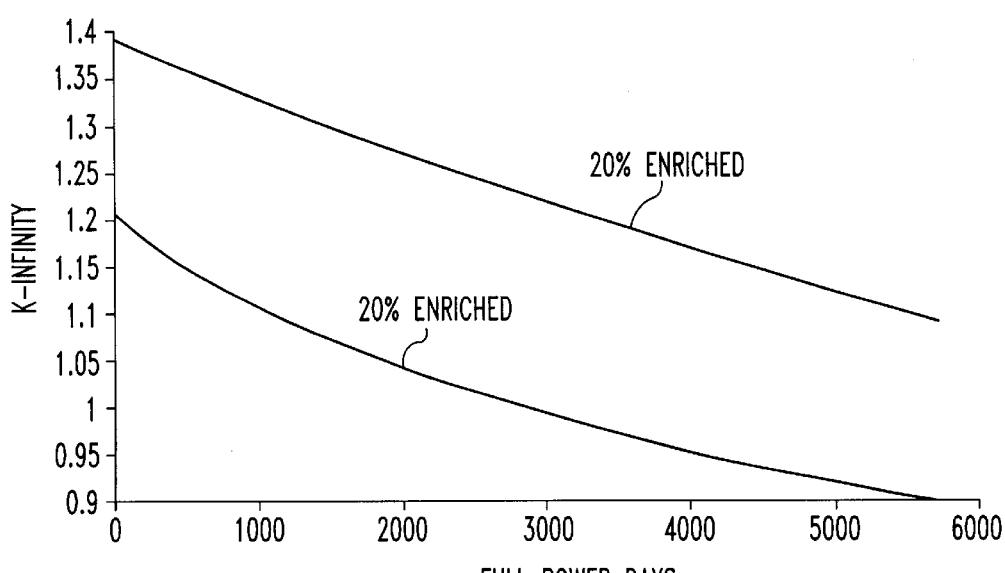
FIG. 3 is a plot illustrating the feasibility of the long life of a nuclear steam supply system in accordance with the invention.

As mentioned, an important feature of the invention is that the reactor core 13 has a core life of at least 10 years and preferably at least fifteen years without refueling or fuel shuffling. This is achieved with a fast or epithermal spectrum reactor core. In order to achieve the high conversion ratio required for a fast or epithermal neutron spectrum, a tight lattice core which minimizes the water volume fraction is necessary. A tight lattice core means that the fuel rods are spaced close together. Quantitatively, a p/d (pitch to diameter) ratio of less than about 1.1 is needed. As is known, such a small p/d ratio is achieved by use of the known triangular lattice. As is also known, the fuel for such a fast or epithermal spectrum reactor core is uranium enriched with plutonium though a thorium based fuel can also be used. Reactivity is controlled by burnable poison added to the fuel. Initially, the excess neutrons are captured by the poison. As the reactivity decreases, the burnable poisons also are depleted. As can be seen from FIG. 3, with a 20% enrichment (the maximum allowed under the proliferation resistance requirement), criticality is maintained well beyond 5,952 FPD (full power days), or about 20 years at 80% CF (capacity factor). At 15 years (5,475 days), there is still 15% excess reactivity with a core burn-up of 74,000 MWd/t (megawatt days thermal). Based on these preliminary results, it is expected that a reactivity lifetime of about fifteen years could be achieved with a U/235 enrichment between 12 and 15% at the p/d assumed. This preliminary analysis shows that a water-cooled fast or epithermal spectrum core can last, from a criticality point of view, about fifteen years in a straight burn mode. When a realistic core configuration is considered, including the effects of leakage and parasitic losses, fuel forms other than the $^{235}UO_2$ used in the example of FIG. 3 may show better performance with regard to burn-down behavior, cycle length and required p/d ratio.

Adoption of a fast or epithermal spectrum allows the use of more robust cladding materials, such as stainless steel or advanced alloys, because the good neutronics properties of Zircaloy® are no longer necessary. Stainless steel and advanced (e.g., refractory) alloys are very reliable at high temperatures and in the presence of boiling. In addition, the stainless steel cladding will better be able to resist the swelling of the fuel and containment of the fission gases over the fifteen-year life span than the zirconium-based materials.

As mentioned above, a tight lattice fuel configuration is needed for the fast or epithermal spectrum neutronics. However, this increases flow resistance which is detrimental to achieving natural circulation. Natural circulation is enhanced by a minimum pressure drop and a high driving head. As already discussed, the pool configuration eliminates the piping losses inherent in a loop system. In order to minimize the pressure drop, we have opted to decrease the required core mass flow rate by using a much larger core ΔT than is conventionally used in the typical PWR. Since the temperature of the light water exiting the reactor core is dictated by the pressure level, which we have kept comparable to that in conventional PWRs at about 160 bar, the core inlet temperature was decreased. Thus, we have a core exit temperature of about 320 degrees C (without boiling) and a core inlet temperature of 235 degrees C, to provide a ΔT of 85 degrees C (without boiling). This is compared to a similar exit temperature, but with only a 35 degree C ΔT in a conventional PWR. The pressure drop can be further limited by keeping the core height to a minimum necessary to ensure the required degree of natural circulation.

To maximize the driving head, chimney channels 55 are provided in the chimney 17 above the reactor core to channel water at different enthalpies. This raises the level at which the heated water from the core mixes with the pool of coolant. As shown in FIG. 1, the chimney channels vary in height. This is because the temperature across the core varies. In the example shown, the channels 55 at the center are higher than those at the periphery. This optimizes the conditions near the end of the fuel cycle. At the beginning, the reverse would be true. It may be more suitable to make all the chimneys the same height to average the effect over the life of the core.

The driving head can be further increased by allowing partial boiling at the top of the core to further decrease the density in the hot leg. For instance, a steam fraction of from about 5–20%, with a preferred value of about 10%, achieves this increase in driving head.

Another consideration for enhanced natural circulation is a fuel rod configuration with an enhanced heat transfer area to achieve simultaneously the conflicting requirements of tight pitch and high natural circulation. A high heat transfer area offsets the decrease in heat transfer coefficient caused by the low flow rate which is necessary to keep the pressure drop low. The following Table I sets forth the major reactor parameters used in feasibility studies performed to address key neutronic and thermal hydraulic issues.

TABLE I

Major reactor parameters used in feasibility assessment

| | | |
|---|---|---|
| Reactor thermal power | - | 500 MW |
| Core inlet temperature | - | 235° C. |
| Core exit temperature | - | 320*, 347+° C. |
| Exit quality | - | 0*, 0.1+ |
| Primary loop pressure | - | 160 bar |
| Fuel rod type | - | solid, annular |
| Fuel rod outside diameter | - | 7, 9, 11 mm |
| Fuel rod inside diameter | - | 0, 2, 3, 4 mm |
| P/D ratio | - | 1.1 |
| Total primary loop pressure drop | - | 2.5 times the core pressure drop |
| Core height | - | 1 m |
| Chimney height | - | 5 m |
| Steam generator height | - | 4 m |
| Natural circulation head | - | 0.05*, 0.14+ bar |
| Fuel type | - | oxide |
| Maximum nominal fuel temperature | - | 1200° C. |

*No boiling
+With boiling

In addition to the standard solid rod, annular rod configurations were analyzed to assess the effect of increasing the heat transfer area. Thermal conductivities assumed for rod temperature calculations were stainless steel cladding, helium gap and oxide fuel. Note that lower fuel temperatures can be achieved with a fuel/cladding heavy liquid metal (e.g., Pb, Pb—Bi, or Sn) bond, which is not reactive with water. Of course, the use of metal fuel will also yield lower temperatures. All calculations were for nominal conditions and the maximum normal fuel limiting temperature of 1200° C. was estimated by assuming a conservative maximum hot spot of 2500° C. (~4500°F.) and a cumulative (and conservative) uncertainty factor of 2.5. The calculated performance parameters were: natural circulation ratio (defined as the ratio of the natural convection head to the total pressure drop); core diameter (calculated from the total number of rods and assuming 217 rods per assembly); and, maximum nominal fuel temperature. The cases where the maximum temperature exceeded 1200° C., and/or the natural circulation ratio dropped below 0.35, and/or the core diameter exceeded 1.5 m were discarded. These were of course rather arbitrary limits and in a couple of cases we kept configurations which were not quite satisfying all constraints, but were still judged overall attractive. Table II summarizes the configurations which satisfy all the above constraints.

TABLE II

Many configurations can be the starting point for an optimized, attractive design

| Rod Type | OD (mm) | ID (mm) | Boiling | NCR | Core D (m) | Max T (° C.) |
|---|---|---|---|---|---|---|
| Annular | 7 | 2 | Yes | 1.09 | 1.41 | 482 |
| Annular | 7 | 2 | Yes | 0.37 | 1.01 | 608 |
| Annular | 9 | 3 | Yes | 1.18 | 1.30 | 552 |
| Annular | 9 | 3 | Yes | 0.61 | 1.13 | 653 |
| Annular | 9 | 3 | Yes | 0.38 | 0.95 | 782 |
| Annular | 9 | 3 | No | 0.33 | 1.30 | 521 |
| Solid | 9 | — | Yes | 0.81 | 1.30 | 1041 |
| Annular | 11 | 4 | Yes | 1.50 | 1.38 | 622 |
| Annular | 11 | 4 | Yes | 0.97 | 1.16 | 712 |
| Annular | 11 | 4 | Yes | 0.67 | 0.95 | 802 |
| Annular | 11 | 4 | Yes | 0.49 | 0.95 | 892 |
| Annular | 11 | 4 | No | 0.57 | 1.38 | 550 |
| Annular | 11 | 4 | No | 0.39 | 1.38 | 614 |
| Annular | 11 | 4 | No | 0.93 | 1.59 | 505 |
| Solid | 11 | — | Yes | 2.00 | 1.59 | 1010 |
| Solid | 11 | — | No | 0.31 | 1.38 | 1130 |

Other fuel rod configurations can be considered, which may be more effective than the annular rod in enhancing the heat transfer area, such as, for example, finned elements both straight and twisted, petal-lobe elements, and an inverted fuel bundle geometry, where flow channels are within solid fuel blocks which was used, and tested, in the NERVA space reactor. Also, the imposed limit of 1200° C. is very conservative and more detailed calculations will allow its relaxation, thus allowing more latitude in the geometry selection.

The key conclusion of these preliminary analyses performed for the disclosed reactor concept is that a hard neutron spectrum, tight lattice water cooled core is indeed feasible from the point of view of long core life and high level of natural circulation. The fact that a number of different configurations satisfied the rather arbitrary and restrictive imposed limits indicated that ample room exists for a satisfactory point design and future optimization.

Figure 4:
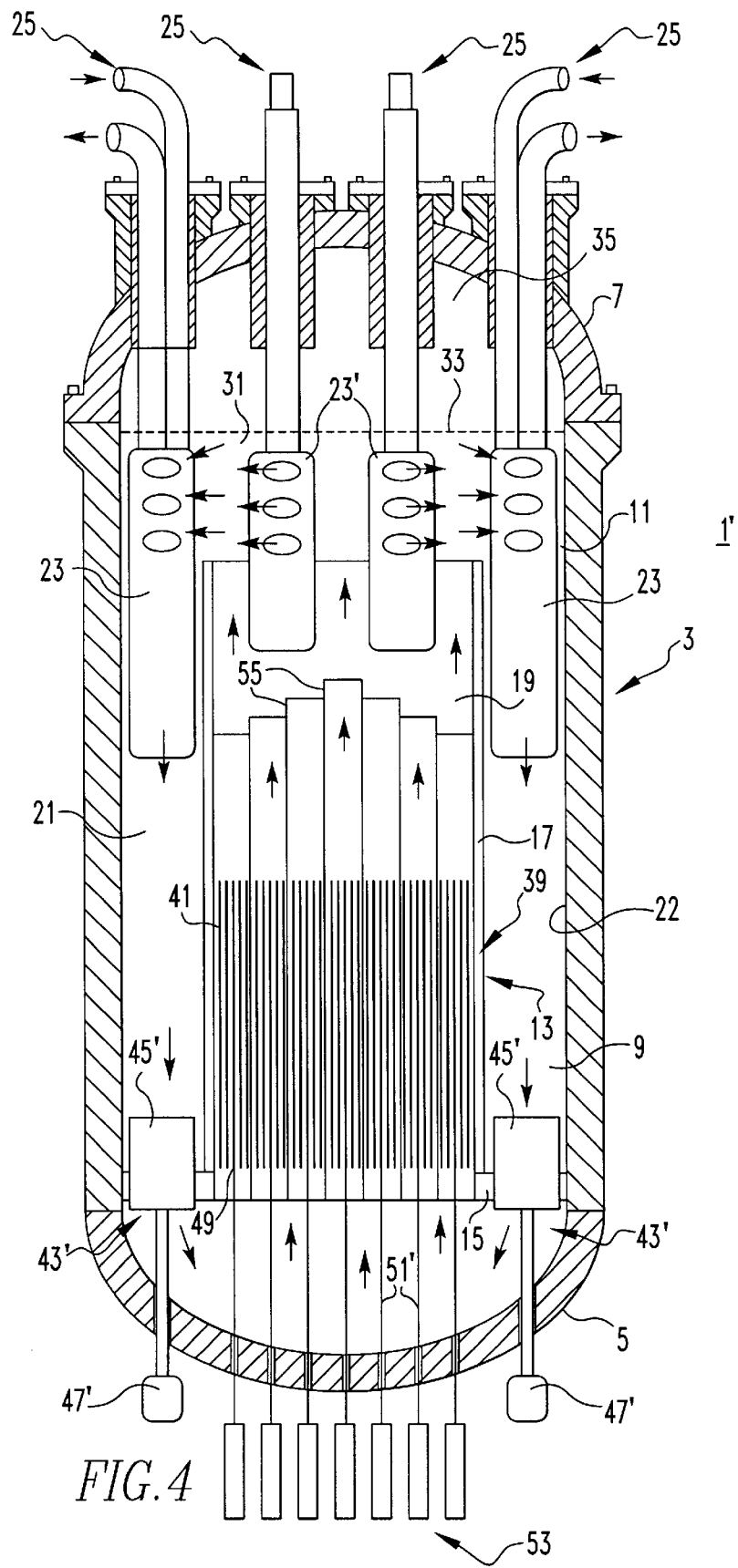
FIG. 4 is a schematic vertical section through a second embodiment of a nuclear steam supply system in accordance with the invention.

A second embodiment of the invention is illustrated in FIG. 4. In this NSSS 1', the control rods 49 are inserted and withdrawn from the core by drivelines 51' which extend through the bottom head 5 of the reactor. This makes room for additional steam generators 23' in the upper section 11 of the pressure vessel 3, where, as shown, they extend downward into the central passage 19. This provides more redundancy for the steam generators. Alternatively, it makes it possible to reduce the height, and therefore the pressure drop, of the steam generators, as they contribute about one half of the total pressure drop. It also opens the opportunity to profile the steam generators by adjusting the height, size, flow resistance and steam temperature to optimize performance. For example, steam generators on the periphery might generate steam at a slightly lower temperature than those in the center and can therefore be used for reheat. This configuration also enhances proliferation resistance, as the steam generators 23' must be removed to access the fuel.

As a further refinement, the chimney channels 55 could be extended all the way up to the steam generators 23' with each assembly servicing a separate steam generator. In this arrangement, the cold water will mix after exiting the individual steam generators. The reactor coolant pumps 43' can be mounted with the impellers 45' supported on the core support structure 15 and with the external motor drive 47' penetrating through the bottom head 5.

Small NSSS like that described above obviously cannot claim economies of scale, but actually can be built in multiple modules thus offering cost reductions through multiple identical units. This concept can be further exploited by adoption of multiple components in a single unit and a "once through" approach. This has significant beneficial effects also on maintenance and waste disposal. For an appreciation of the advantages of multiple components in a single unit, consider the following example. Assume that a 600 MWe "plant" is requested by a customer; this translates into roughly 1800 MWt or four NSSS 1 modules of 450 MWt each. To convert the heat from each 450 MWt unit, assume that we employ nine steam generators rated at 50 MWt each. Note that by using a pool reactor, versus the conventional loop arrangement of today's reactors, there is really no separate piping, pumps, valves, etc. for each steam generator. Now we line up 18 steam generators along the pool wall rather than the required nine. This provides 100% redundancy, that is, throughout the life of the plant we can replace failed generators (which experience shows has a good probability of happening) with a simple on-line "plug out/plug in" procedure rather than having long out-of-service repairs. It should also be remembered that with a 15-year fuel life there are no outages for fuel refueling which can be used for repairs and maintenance; thus minimization of maintenance is economically imperative. An additional advantage of this arrangement is that extra steam generators can be activated for handling peak power production. From the point of view of economy of construction, in the above example a 600 MWe plant will require 72 steam generators, or 144 for the equivalent of a four-loop 1200 MWe plant. It is obvious that a mini-mass production is indeed feasible, especially if more than one unit is deployed (current schemes call for about ten units to be deployed concurrently worldwide).

Along the same logic, the NSSS 1 will have a lifetime equal to that of its fuel loading, i.e., around 15 years. When the fuel life is exhausted, the entire reactor is replaced without ever taking the fuel out. In terms of economics, this is the opposite of current practice; instead of having a single large plant where lifetime is stretched as long as possible, we have a fleet of smaller plants replaced relatively frequently and whose components are built in large numbers. From the point of view of proliferation resistance and environmental acceptance there is no spent fuel to deal with. The entire reactor, after draining the water, is removed and buried in a permanent repository. The reduction in waste disposal of spent fuel is dramatic because of the five-fold increase in fuel lifetime and the elimination of low level waste generated during normal refueling operations.

It is envisioned that the NSSS 1 will also be delivered as an assembled unit to the host country, thus precluding access to the fuel at any time.

Economically, the target for this system is to produce power at a total cost less than 2C/kWhr. It is expected to achieve this because of the following:

1. Elimination of entire reactor systems such as emergency core cooling (because of passive safety against loss of coolant and loss of flow), refueling (because of long core life) and coolant poison control (because of the use of burnable poisons)
2. Simplification and compactness of reactor and primary system, because of the use of the pool configuration
3. Reduction in fuel cycle cost, because of the 15-year single charge
4. Minimization of maintenance, though the use of modularity and redundancy
5. Increase in capacity factor, reduction in O/M costs and reduced need for supporting infrastructure, because of the elimination of refueling outage and minimized maintenance
6. Use of "mini-mass" factory production and assembly of components
7. No spent fuel separation, storage and disposal.
8. No site decommissioning costs, because the entire reactor is taken back.

In summary, the NSSS of the invention will be safer, cheaper and environmentally friendlier than the presently available or proposed systems.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given tile full breadth of the claims appended and any and all equivalents thereof.

What is claimed is:

1. A nuclear steam supply system with a life of at least 10 years, comprising:

an upright pressure vessel containing a pool of light water;

a fast or epithermal spectrum reactor core immersed in said pool of light water;

a plurality of steam generators immersed in said pool of light water within said pressure vessel and each having a secondary circuit extending outside said pressure vessel, said plurality of steam generators exceeding a predetermined number of said steam generators needed to operate said reactor core at full power and selected from among said plurality of steam generators; and means within said pressure vessel inducing a flow within said pool of light water through said reactor core and said at least one steam generator and back to said reactor core.

2. The nuclear steam supply system of claim 1 wherein said means inducing a flow within said pool of reactor coolant includes a certain number of reactor coolant pumps immersed in said pool of reactor coolant and of which a smaller maximum number of reactor coolant pumps operate simultaneously to induce said flow within said pool of reactor coolant while remaining reactor coolant pumps are inactive but available as spares so that no more than said smaller maximum number of reactor coolant pumps are active simultaneously.

3. The nuclear steam supply system of claim 1 wherein said means inducing a flow in said pool of light water comprises a certain number of reactor coolant pumps immersed in said pool of light water and of which a smaller maximum number of reactor coolant pumps operate simultaneously to induce said flow of light water while the remaining reactor coolant pumps are inactive but available as spares such that no more than said smaller maximum required number of reactor coolant pumps are active simultaneously.

4. The nuclear steam supply system of claim 3 wherein said upright pressure vessel is generally cylindrical with a lower section and upper section, said reactor core is positioned generally centrally in said lower section of said pressure vessel and said means inducing a flow within said pool of reactor coolant includes a core chimney extending upward from said reactor core toward said upper section forming a central passage above said reactor core and annular passage adjacent an inner surface of said pressure vessel, said steam generators being located in said upper section of said pressure vessel and said reactor coolant pumps being positioned to draw said reactor coolant down through said annular passage.

5. The nuclear steam supply system of claim 4 wherein said reactor coolant pumps have impellers immersed in said pool of reactor coolant within said pressure vessel, and motors driving said impellers mounted outside said pressure vessel.

6. The nuclear steam supply system of claim 1 wherein said reactor core produces approximately 5–20% steam in the light water exiting said reactor core.

7. The nuclear steam supply system of claim 6 wherein said reactor core produces approximately 10% steam in the light water exiting said reactor core.

8. The nuclear steam supply system of claim 7 wherein said at least one steam generator comprises a plurality of steam generators immersed in said pool of light water within said pressure vessel and each has a secondary circuit extending outside said pressure vessel, said plurality of steam generators exceeding a predetermined number of steam generators needed to operate said reactor core at full power and selected from among said plurality of steam generators.

9. The nuclear steam supply system of claim 1 wherein said fast or epithermal spectrum reactor core has fuel rods with a pitch to diameter ratio of no more than about 1.1 and with a surface area which is more than a surface area of a cylindrical rod of the same diameter.

10. The nuclear steam supply system of claim 9 wherein said fuel rods have an annular cross section.

11. The nuclear steam supply system of claim 9 wherein said fuel rods have stainless steel cladding.

12. The nuclear steam supply system of claim 1 wherein said upright pressure vessel is generally cylindrical with a lower section and an upper section, said reactor core is positioned generally centrally in said lower section of said pressure vessel and said means inducing flow within said pool of reactor coolant includes a core chimney extending upward from said reactor core toward said upper section of said pressure vessel and forming a central passage above said reactor core and an annular passage adjacent an inner surface of said pressure vessel, said steam generators being; located in said upper section where at least some of said steam generators extend into said annular passage.

13. The nuclear steam supply system of claim 12 wherein all of said steam generators extend into said annular passage and said reactor core has control rods inserted by drivelines extending downward through a top of said pressure vessel and said central passage.

14. The nuclear steam supply system of claim 12 wherein others of said steam generators are located in said upper section of said pressure vessel and aligned with said central passage.

15. The nuclear steam supply system of claim 14 wherein said reactor core has control rods inserted by drivelines inserted through a bottom of said pressure vessel.

16. The nuclear steam supply system of claim 1 wherein said upright pressure vessel is generally cylindrical and has a lower section and an upper section, said reactor core is positioned generally centrally in said lower section of said pressure vessel and said means inducing said flow in said pool of light water comprises a core chimney extending upward from said reactor core toward said upper section of said pressure vessel creating a central passage above said reactor core and an annular passage between said chimney and an inner surface of said pressure vessel and extending down below said reactor core, said steam generator comprising a plurality of steam generators in said upper section of said pressure vessel with sufficient capacity to produce a ΔT across said reactor core of at least approximately 75 degrees C.

17. The nuclear steam supply system of claim 16 wherein said plurality of steam generators exceeds a predetermined number of steam generators needed to operate said reactor core at full power and selected from said plurality of steam generators.

18. The nuclear steam supply system of claim 16 wherein said reactor core produces partial boiling of said light water and said steam generators have sufficient capacity to produce a ΔT across said reactor core of at least 100 degrees C.

19. The nuclear steam supply system of claim 18 wherein said reactor core produces about 5–20% steam in light water exiting said reactor core and said chimney comprises a plurality of chimney channels extending across said reactor core and upward within said central passage to raise the level at which light water containing steam exiting the reactor core mixes with said pool of light water.

* * * * *